3 Sheets—Sheet 1.

N. CHAPMAN.

Assignor by mesne assignments to the DUTCHER TEMPLE CO

MACHINE FOR SETTING TEMPLE-TEETH.

No. 7,477. Reissued Jan. 30, 1877.

Witnesses.

Lot Latimer
W. J. Pratt

Inventor

Nathan Chapman
per Crosby & Gregory Attys.

3 Sheets—Sheet 2.

N. CHAPMAN.

Assignor by mesne assignments to the DUTCHER TEMPLE CO.

MACHINE FOR SETTING TEMPLE-TEETH.

No. 7,477. Reissued Jan. 30, 1877.

Witnessee.

L. H. Latimer

W. J. Pratt

Inventor

Nathan Chapman per Crosby & Gregory Attys.

N. CHAPMAN.

Assignor by mesne assignments to the DUTCHER TEMPLE CO.

MACHINE FOR SETTING TEMPLE-TEETH.

No. 7,477. Reissued Jan. 30, 1877.

*Witnesses.*

L. H. Latimer
W. J. Pratt

*Inventor.*

Nathan Chapman
per Crosby & Gregory Atty.

UNITED STATES PATENT OFFICE.

NATHAN CHAPMAN, OF HOPEDALE, MASSACHUSETTS, ASSIGNOR, BY MESNE ASSIGNMENTS, TO THE DUTCHER TEMPLE COMPANY.

IMPROVEMENT IN MACHINES FOR SETTING TEMPLE-TEETH.

Specification forming part of Letters Patent No. 168,719, dated October 11, 1875; reissue No. 7,477, dated January 30, 1877; application filed December 1, 1876.

*To all whom it may concern:*

Be it known that I, NATHAN CHAPMAN, of Hopedale, in the county of Worcester, and State of Massachusetts, have invented certain new and useful Improvements in Machines for Setting Teeth in Rollers for Loom-Temples; of which the following is a full, clear, and exact description, which will enable others skilled in the art to which it appertains to make and use the same, reference being had to the accompanying drawing, and to the letters of reference marked thereon, which form a part of this specification.

This invention has reference to mechanism for automatically setting teeth in temple-rollers; and the invention relates to the combination, with a tooth-holder adapted to contain or hold a number of teeth to be driven, of a tooth-transferrer, adapted to transfer such teeth from the holder to a position to be driven. Also, in the combination with a tooth-holder, and a tooth-transferrer, of a tooth-driver, to drive the teeth from the transferrer into the roller. Also, in the combination, with a drill for drilling holes in the roller, and a tooth-driver, of a tooth-holder and a tooth-transferrer, substantially as described. Also, in the combination, with mechanism for moving the temple-roller longitudinally and axially, of a drill, a tooth-holder, tooth-transferrer, and a driver, substantially as described.

Figure 2:
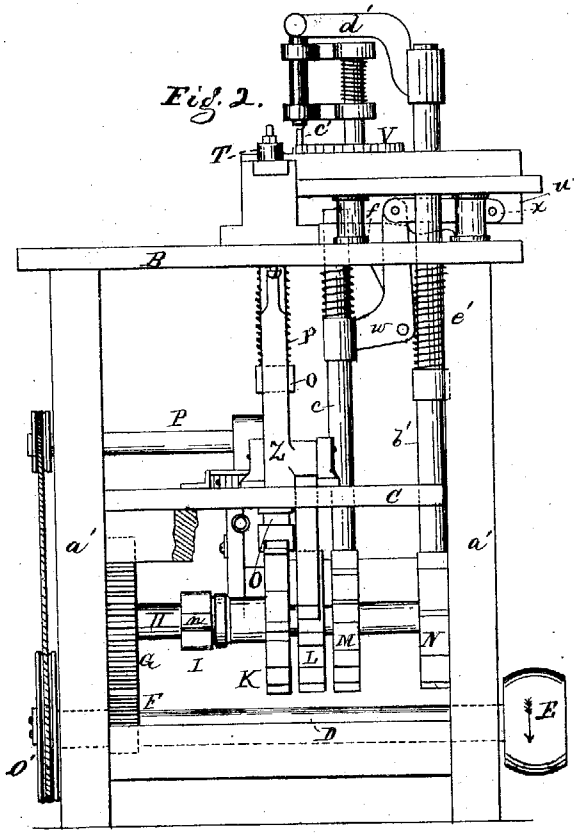
Figure 1:
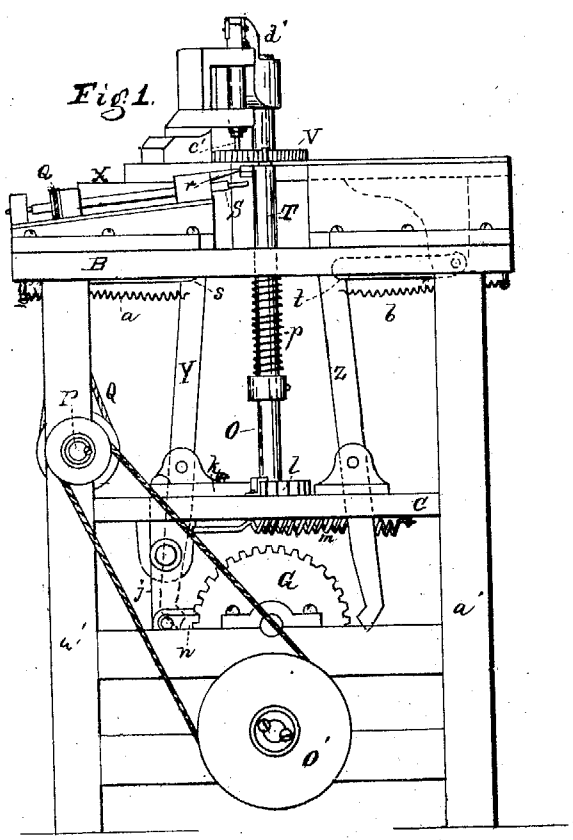
Figure 3:
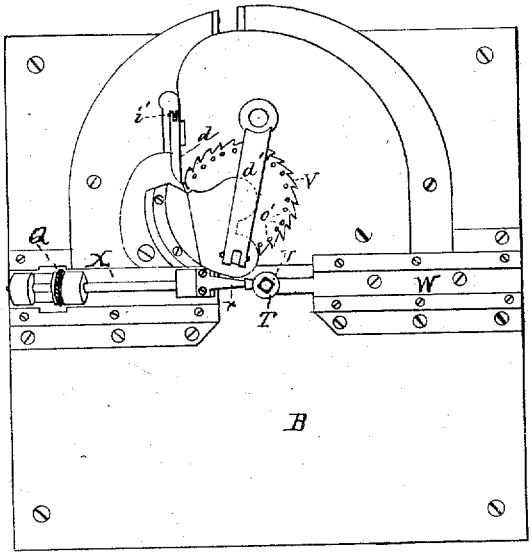
Figure 5:
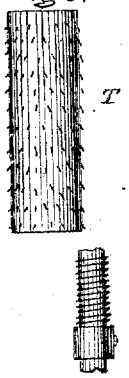
Figure 4:
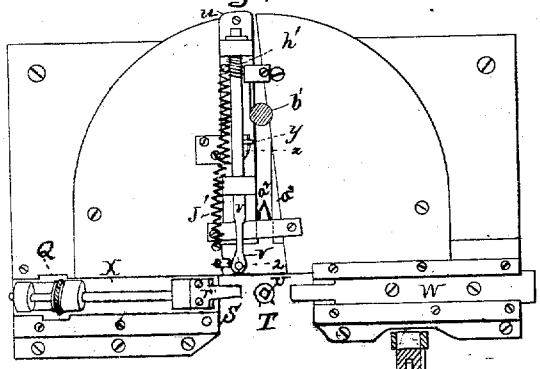
Figure 6:
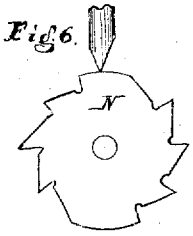
Figure 7:
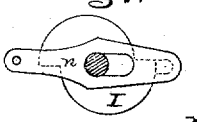
Figure 9:
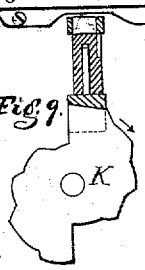
Figure 10:
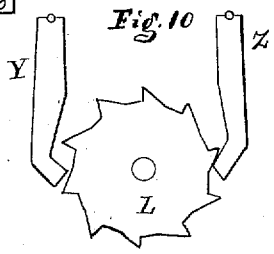
Figure 11:
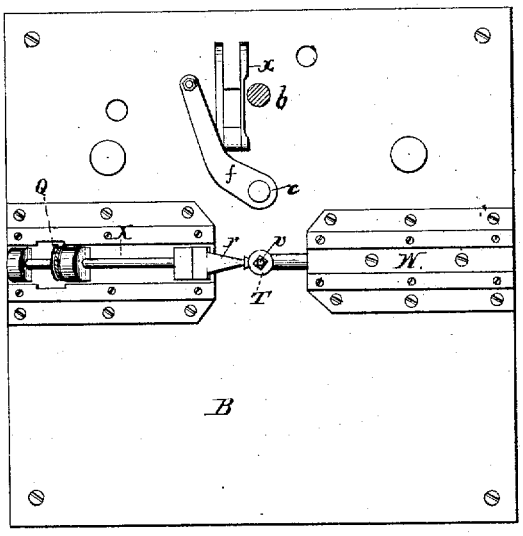
Figure 12:
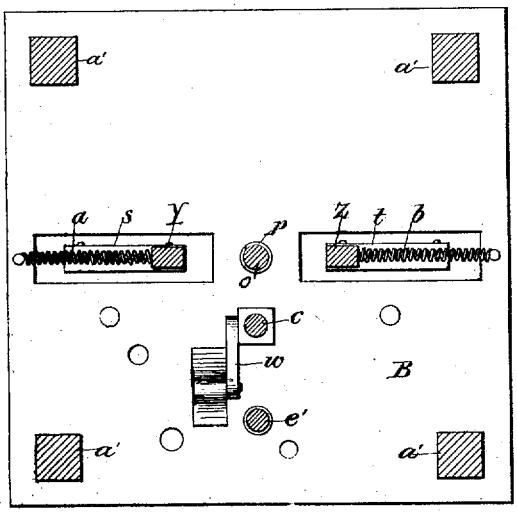
Figure 13:
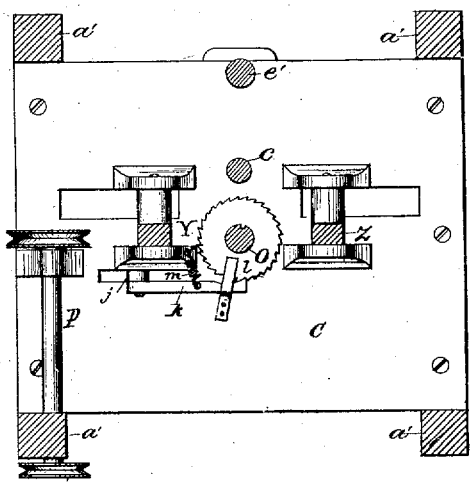

Figure 1 represents in front view a machine provided with these improvements. Fig. 2 is a side view of the same. Fig. 3, Sheet 2, is a top view. Fig. 4, Sheet 2, is a view with the top plate and some other parts removed, in order to show the working parts. Fig. 5, Sheet 2, is a view of a roller with the teeth all set in place. Figs. 6, 7, 8, 9, and 10, Sheet 2, are detached views of the cams and other devices. Fig. 11, Sheet 3, represents a top plan of table B, with devices between it and the upper adjacent platform, which appear when the platform is removed; Fig. 12, an under-side plan of table B, with attached devices, as would appear after a horizontal section of the machine about half-way between the tables B and C, and Fig. 13 represents a top plan of the table C with attached devices, after section, as above described.

The frame-work *a'* of the machine is of suitable form to support the working parts. This frame is crowned by a table, B, and provided with a platform, C, both of which serve for attaching and supporting the machinery. At the lower part of this frame is a horizontal shaft, D, having a band-pulley, E, driven in any usual way, and a pinion, F, which gears into the cog-wheel G, to operate the shaft H, and the series of cams thereon, (best seen in Fig. 2, at I, K, L, M, and N,) the action of which will be hereafter separately explained. This shaft D also carries a band-wheel, O', which gives motion to the shaft P, and, by means of a second band, Q, operates the drill S, to bore holes in the roller T, for the reception of the teeth.

The action of the cams above mentioned will be understood from the following brief description: The roller T, to be set with teeth, is mounted on, or connected with, the temple-roller-controlling shaft O, adapted to rotate the roller and move it longitudinally, so that it may be presented in proper position to receive the teeth, they being inserted, preferably, in spiral lines about the roller. This shaft O is moved longitudinally, as herein shown, by the cam K, Figs. 9 and 2, against which the shaft bears, a spring, *p*, moving the shaft in opposition to the cam. The shaft O derives its intermitting rotary motion, after each tooth is set, through the action of a cam, I, that operates a slotted arm, *n*, connected with a lever, *j*, provided with a pawl, *k*, that engages the teeth of a ratchet-wheel, *l*, connected with the shaft O, preferably by a pin-and-slot connection, to permit the longitudinal motion of the shaft with relation to the wheel. (See Fig. 13.) A spring, *m*, operates the pawl in one direction. The cam L, Figs. 2 and 10, operates the rest W and slide X in one direction through levers Y and Z and links *s* and *t*, attached to the rest and slide, springs *a* and *b* moving the rest and slide in the opposite directions.

The slide X is herein shown as carrying the drill to makes the holes in the roller, and the driver *r* to drive the teeth into such holes. In order that the teeth may be placed at the proper pitch with relation to the roller, the slide X is made to move in a path inclined to the periphery of the roller.

The rest W bears against the rear of the temple-roller during the operation of the drill and driver, to prevent the roller from yielding or moving laterally.

Figure 8:
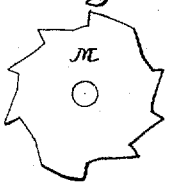

The cam M, Figs. 2 and 8, moves the slide *c*, elbow-lever *w*, and slide *u*, Fig. 4, which carries the tooth-transferrer *v*, made as a pair of spring-arms or forceps.

A coiled spring, J′, Fig. 4, serves to move the slide *u* and tooth-transferrer forward when released by the cam M. This transferrer *v* has an opening, 2, to receive and firmly hold the tooth.

The shank of the transferrer is shown as provided with a small pin, *y*, Fig. 4, which works against a cam, *z*, and thus gives the transferrer a quarter-turn as it moves back, an opposing coiled spring, *h′*, Fig. 4, giving the transferrer a reverse quarter-turn in its forward motion. This cam M also operates the tooth-holder V by means of a lifting-arm, *f*, on the top of slide *c*, which arm moves the elbow-lever *i′* and pawl *d*, thus operating the tooth-holder sufficiently to present a new tooth to the transferrer.

The cam N moves the slide *b′*, with its arm *d′*, provided with a tooth-detacher, *c′*, and retains it above the tooth-holder V until it is desired to supply the transferrer with a tooth, when the action of a spring, *e′*, moves the slide or lifter *b′* down, and the detacher *c′* detaches a tooth from the tooth-holder V, and the tooth so detached is received in the transferrer.

The operation of the invention is as follows: A blank roller, T, being placed on the spindle U, supported on the shaft O, Fig. 1, and the tooth-holder being supplied with blank teeth ready for insertion in the roller, the machine may be set in motion. The drill S, advanced by the slide X, operated from cam M, makes a hole in the roller, (it being prevented from springing backward by the slide-rest W,) and the drill, it being set in oblique position to the axis of the roller, gives to the hole in the roller its proper inclination or pitch. After the hole is drilled, the tooth-transferrer *v*, previously supplied with a tooth from the tooth-holder, (which is a reservoir for holding teeth with butts and points in proper position to be received by the transferrer,) moves toward the roller, making, in this instance, substantially a quarter-turn, so as to present a tooth with its butt in front of a hole in the roller, and in proper position to be struck by a driver, *r*, (see Figs. 1 and 4,) that drives the tooth from the transferrer into the hole in the roller. The tooth-transferrer is then withdrawn and presented in proper relation with the tooth-holder and its teeth, to be again supplied with a tooth.

As the work progresses the roller T is moved intermittingly by the cam I, and other devices, and the teeth are set therein, substantially as above described.

The teeth to be set are held in openings *o′* of the tooth-holder V, from which they are removed by the detacher.

The slide *u* is kept in its seat with sufficient exactness by a V-shaped spring, $a^2$, one limb of which bears against the slide, and the other is connected with a sliding block, $a^3$, the spring and block both moving with the slide.

I claim—

1. In a machine for setting temple-teeth, the combination, with a tooth-holder to contain the teeth to be set, of a tooth-transferrer, substantially as described.

2. A tooth-holder and a tooth-transferrer, in combination with a tooth-driver, substantially as described.

3. A drill to form holes in a temple-roller, and a tooth-driver, in combination with a tooth-holder and tooth-transferrer, substantially as described.

4. A temple-roller-controlling shaft adapted to move the temple-roller longitudinally and axially, in combination with a tooth-holder, and a tooth-transferrer, to present a tooth to a driver to be driven, substantially as described.

5. In a machine for setting-temple teeth, a tooth-holder, and a mechanism to remove the teeth singly from the holder, substantially as described, in combination with a tooth-transferrer and a tooth-driver, substantially as set forth.

6. A shaft or holder for a temple-roller, in combination with a tooth-transferrer or presenter, a driver, and a rest for the roller, substantially as described.

7. In a machine for setting temple-teeth, the combination, with a tooth-holder and transferrer, of a tooth-detacher, to remove a tooth from the holder into the transferrer, substantially as described.

8. In a machine for setting temple-teeth, a tooth-transferrer, in combination with a tooth-driver, substantially as described.

NATHAN CHAPMAN.

Witnesses:

CYRUS BRADBURY,

F. G. DUTCHER.